United States Patent
Han et al.

(10) Patent No.: US 12,301,129 B2
(45) Date of Patent: May 13, 2025

(54) POWER CONVERTING DEVICE AND HOME APPLIANCE INCLUDING THE SAME

(71) Applicant: LG ELECTRONICS INC., Seoul (KR)

(72) Inventors: Sangchul Han, Seoul (KR); Chaseung Jun, Seoul (KR); Sangju Lee, Seoul (KR); Taewoong Kong, Seoul (KR); Hyojin Choi, Seoul (KR); Jinwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 17/909,245

(22) PCT Filed: Mar. 3, 2021

(86) PCT No.: PCT/KR2021/002620
§ 371 (c)(1),
(2) Date: Sep. 2, 2022

(87) PCT Pub. No.: WO2021/177720
PCT Pub. Date: Sep. 10, 2021

(65) Prior Publication Data
US 2024/0039387 A1    Feb. 1, 2024

(30) Foreign Application Priority Data

Mar. 5, 2020 (KR) .................. 10-2020-0027647

(51) Int. Cl.
*H02M 7/48*    (2007.01)
*H02M 1/00*    (2006.01)
(Continued)

(52) U.S. Cl.
CPC ....... *H02M 7/4815* (2021.05); *H02M 1/0054* (2021.05); *H02M 7/483* (2013.01);
(Continued)

(58) Field of Classification Search
CPC ............ H02M 1/0054; H02M 7/4815; H02M 1/0048; H02M 7/483; H02M 7/487
See application file for complete search history.

(56) References Cited

U.S. PATENT DOCUMENTS 6,633,285 B1 * 10/2003 Kigo .................... G09G 3/2965
345/55
10,511,235 B1 * 12/2019 Lin ...................... H02M 7/5395
(Continued)

FOREIGN PATENT DOCUMENTS

CN      103262648 A    8/2013
CN      109586602 A    4/2019
(Continued)

*Primary Examiner* — Alex Torres-Rivera
(74) *Attorney, Agent, or Firm* — Birch, Stewart, Kolasch & Birch, LLP

(57) ABSTRACT

The present disclosure relates to a power converting device and a home appliance including the same. A power converting device according to an embodiment of the present disclosure comprises a first capacitor, a first switching element turned on to output a first voltage stored in the first capacitor to a first node which is one end of an inductive load, a second switching element, one end of which is connected to the first switching element and which is turned on to decrease the voltage of the first node to the first voltage, a third switching element turned on to output a second voltage greater than the first voltage to the first node which is one end of the inductive load, and a fourth switching element, one end of which is connected to the third switching element and which is turned on to decrease the voltage of the first node to the ground voltage. Accordingly, switching loss may be reduced when power is supplied to an inductive load.

8 Claims, 18 Drawing Sheets

(51) Int. Cl.
*H02M 7/483* (2007.01)
*H02M 7/487* (2007.01)
*H05B 6/04* (2006.01)
*H05B 6/06* (2006.01)

(52) U.S. Cl.
CPC ............. *H02M 7/487* (2013.01); *H05B 6/04* (2013.01); *H05B 6/06* (2013.01)

(56) References Cited

U.S. PATENT DOCUMENTS

| | | | | |
|---|---|---|---|---|
| 2006/0097648 A1* | 5/2006 | Shin | ................... | G09G 3/2965 |
| | | | | 315/169.4 |
| 2010/0258556 A1* | 10/2010 | Hayashi | ............... | H05B 6/1272 |
| | | | | 219/661 |

FOREIGN PATENT DOCUMENTS

| | | |
|---|---|---|
| JP | 2009-110893 A | 5/2009 |
| JP | 2016-213116 A | 12/2016 |
| JP | 2018-57212 A | 4/2018 |
| KR | 10-2018-0078562 A | 7/2018 |

* cited by examiner

POWER CONVERTING DEVICE AND HOME APPLIANCE INCLUDING THE SAME

CROSS REFERENCE TO RELATED APPLICATIONS

This application is the National Phase of PCT International Application No. PCT/KR2021/002620, filed on Mar. 3, 2021, which claims priority under 35 U.S.C. 119 (a) to Patent Application No. 10-2020-0027647, filed in the Republic of Korea on Mar. 5, 2020, all of which are hereby expressly incorporated by reference into the present application.

BACKGROUND OF THE DISCLOSURE

1. Field of the Disclosure

The present disclosure relates to a power converting device and a home appliance including the same and more particularly, to a power converting device capable of reducing switching loss when supplying power to an inductive load and a home appliance including the same.

2. Description of the Related Art

A power converting device is a device that converts input power and supplies the converted power to a load.

Meanwhile, a single-ended resonant inverter and a half-bridge resonant inverter are used as the power converting device when an inductive load is applied.

However, the operating frequency is low when a single-ended resonant inverter and a half-bridge resonant inverter are used, which adversely affects the size of a resonant capacitor and a resonant inductor to become large.

In addition, since the internal voltage of a switching element is high, there are high chances of burnout of the switching element, and significant switching loss may occur.

SUMMARY

Therefore, the present disclosure has been made in view of the above problems and provides a power converting device capable of reducing switching loss when supplying power to an inductive load and a home appliance including the power converting device.

The present disclosure further provides a power converting device capable of reducing internal voltage of a switching element when supplying power to an inductive load and a home appliance including the power converting device.

The present disclosure yet further provides a power converting device capable of supplying the maximum power to an inductive load using resonance and a home appliance including the power converting device.

To achieve the objective above, a power converting device according to an embodiment of the present disclosure and a home appliance including the power converting device comprise a first capacitor, a first switching element turned on to output a first voltage stored in the first capacitor to a first node which is one end of an inductive load, a second switching element, one end of which is connected to the first switching element and which is turned on to decrease the voltage of the first node to the first voltage, a third switching element turned on to output a second voltage greater than the first voltage to the first node which is one end of the inductive load, and a fourth switching element, one end of which is connected to the third switching element and which is turned on to decrease the voltage of the first node to the ground voltage.

Meanwhile, the first switching element is turned on at a first time point to increase the voltage of the first node to the first voltage, the third switching element is turned on at a second time point after the first time point to increase the voltage of the first node from the first voltage to the second voltage, the second switching element is turned on at a third time point after the second time point to decrease the voltage of the first node from the second voltage to the first voltage, and the fourth switching element is turned on at a fourth time point after the third time point to decrease the voltage of the first node from the first voltage to the ground voltage.

Meanwhile, a power converting device according to an embodiment of the present disclosure and a home appliance including the power converting device may further comprise a resonant capacitor coupled between the other end of the inductive load and the ground.

Meanwhile, the first switching element may be turned on during a first period, the voltage of the first node may increase to the first voltage by resonance based on the inductive load and the resonant capacitor, the third switching element may be turned on during a second period, part of which overlaps the first period, and the voltage of the first node may increase from the first voltage to the second voltage by resonance based on the inductive load and the resonant capacitor.

Meanwhile, the second switching element may be turned on during a third period separated from the second period, the voltage of the first node may decrease from the second voltage to the first voltage by resonance based on the inductive load and the resonant capacitor, the fourth switching element may be turned on during a fourth period, part of which overlaps the third period, and the voltage of the first node may decrease from the first voltage to the ground voltage by resonance based on the inductive load and the resonant capacitor.

Meanwhile, a power converting device according to an embodiment of the present disclosure and a home appliance including the power converting device may further comprise a first diode connected between the first switching element and the first node and a second diode connected between the second switching element and the second node.

Meanwhile, a power converting device according to another embodiment of the present disclosure and a home appliance including the power converting device may comprise a first switching element and a second switching element connected in series with each other, a first capacitor, one end of which is connected to the first switching element and which stores a first voltage, an inductive load connected to a first node between the first switching element and the second switching element, and a third switching element and a fourth switching element connected in series with each other, wherein a node between the third switching element and the fourth switching element is connected to the first node, and the third switching element is connected to a second voltage source for supplying a second voltage, and the voltage of the first node increases step by step based on sequential turning on of the first switching element and the third switching element.

Meanwhile, the voltage of the first node may increase to the first voltage in response to turning on of the first switching element and increase from the first voltage to the second voltage in response to turning on of the third switching element.

Meanwhile, the voltage of the first node may decrease step by step based on sequential turning on of the second switching element and the fourth switching element.

Meanwhile, the voltage of the first node may decrease from the second voltage to the first voltage in response to turning on of the second switching element and may decrease from the first voltage to the ground voltage in response to turning on of the fourth switching element.

Meanwhile, a power converting device according to another embodiment of the present disclosure and a home appliance including the power converting device may further comprise an inductive load connected to one end of the first node and a resonant capacitor coupled between the other end of the inductive load and the ground.

Meanwhile, the first switching element may be turned on during the first period, the voltage of the first node may increase to the first voltage by resonance based on the inductive load and the resonant capacitor, the third switching element may be turned on during the second period, part of which overlaps the first period, and the voltage of the first node may increase from the first voltage to the second voltage by resonance based on the inductive load and the resonant capacitor.

Meanwhile, the second switching element may be turned on during a third period separated from the second period, the voltage of the first node may decrease from the second voltage to the first voltage by resonance based on the inductive load and the resonant capacitor, the fourth switching element may be turned on during a fourth period, part of which overlaps the third period, and the voltage of the first node may decrease from the first voltage to the ground voltage by resonance based on the inductive load and the resonant capacitor.

Meanwhile, a power converting device according to another embodiment of the present disclosure and a home appliance including the power converting device may further comprise a first diode connected between the first switching element and the first node and a second diode connected between the second switching element and the second node.

Effects of the Disclosure

A power converting device according to an embodiment of the present disclosure and a home appliance including the power converting device comprise a first capacitor, a first switching element turned on to output a first voltage stored in the first capacitor to a first node which is one end of an inductive load, a second switching element, one end of which is connected to the first switching element and which is turned on to decrease the voltage of the first node to the first voltage, a third switching element turned on to output a second voltage greater than the first voltage to the first node which is one end of the inductive load, and a fourth switching element, one end of which is connected to the third switching element and which is turned on to decrease the voltage of the first node to the ground voltage. Accordingly, switching loss may be reduced when power is supplied to an inductive load. Also, internal voltage of the switching elements may be reduced when power is supplied to the inductive load.

Meanwhile, the first switching element is turned on at a first time point to increase the voltage of the first node to the first voltage, the third switching element is turned on at a second time point after the first time point to increase the voltage of the first node from the first voltage to the second voltage, the second switching element is turned on at a third time point after the second time point to decrease the voltage of the first node from the second voltage to the first voltage, and the fourth switching element is turned on at a fourth time point after the third time point to decrease the voltage of the first node from the first voltage to the ground voltage.

Accordingly, switching loss may be reduced when power is supplied to an inductive load.

Meanwhile, a power converting device according to an embodiment of the present disclosure and a home appliance including the power converting device may further comprise a resonant capacitor coupled between the other end of the inductive load and the ground. Accordingly, maximum power may be supplied to the inductive load using resonance.

Meanwhile, the first switching element may be turned on during a first period, the voltage of the first node may increase to the first voltage by resonance based on the inductive load and the resonant capacitor, the third switching element may be turned on during a second period, part of which overlaps the first period, and the voltage of the first node may increase from the first voltage to the second voltage by resonance based on the inductive load and the resonant capacitor. Accordingly, switching loss may be reduced when power is supplied to the inductive load.

Meanwhile, the second switching element may be turned on during a third period separated from the second period, the voltage of the first node may decrease from the second voltage to the first voltage by resonance based on the inductive load and the resonant capacitor, the fourth switching element may be turned on during a fourth period, part of which overlaps the third period, and the voltage of the first node may decrease from the first voltage to the ground voltage by resonance based on the inductive load and the resonant capacitor. Accordingly, switching loss may be reduced when power is supplied to the inductive load.

Meanwhile, a power converting device according to an embodiment of the present disclosure and a home appliance including the power converting device may further comprise a first diode connected between the first switching element and the first node and a second diode connected between the second switching element and the second node. Accordingly, a current path in response to turning on of the first switching element or turning on of the second switching element may be formed.

Meanwhile, a power converting device according to another embodiment of the present disclosure and a home appliance including the power converting device may comprise a first switching element and a second switching element connected in series with each other, a first capacitor, one end of which is connected to the first switching element and which stores a first voltage, an inductive load connected to a first node between the first switching element and the second switching element, and a third switching element and a fourth switching element connected in series with each other, wherein a node between the third switching element and the fourth switching element is connected to the first node, and the third switching element is connected to a second voltage source for supplying a second voltage, and the voltage of the first node increases step by step based on sequential turning on of the first switching element and the third switching element. Accordingly, switching loss may be reduced when power is supplied to an inductive load. Also, internal voltage of the switching elements may be reduced when power is supplied to the inductive load.

Meanwhile, the voltage of the first node may increase to the first voltage in response to turning on of the first switching element and increase from the first voltage to the second voltage in response to turning on of the third switching element. Accordingly, switching loss may be reduced when power is supplied to the inductive load.

Meanwhile, the voltage of the first node may decrease step by step based on sequential turning on of the second switching element and the fourth switching element. Accordingly, switching loss may be reduced when power is supplied to the inductive load.

Meanwhile, the voltage of the first node may decrease from the second voltage to the first voltage in response to turning on of the second switching element and may decrease from the first voltage to the ground voltage in response to turning on of the fourth switching element.

Meanwhile, a power converting device according to another embodiment of the present disclosure and a home appliance including the power converting device may further comprise an inductive load connected to one end of the first node and a resonant capacitor coupled between the other end of the inductive load and the ground. Accordingly, maximum power may be supplied to the inductive load using resonance.

Meanwhile, the first switching element may be turned on during the first period, the voltage of the first node may increase to the first voltage by resonance based on the inductive load and the resonant capacitor, the third switching element may be turned on during the second period, part of which overlaps the first period, and the voltage of the first node may increase from the first voltage to the second voltage by resonance based on the inductive load and the resonant capacitor. Accordingly, switching loss may be reduced when power is supplied to the inductive load.

Meanwhile, the second switching element may be turned on during a third period separated from the second period, the voltage of the first node may decrease from the second voltage to the first voltage by resonance based on the inductive load and the resonant capacitor, the fourth switching element may be turned on during a fourth period, part of which overlaps the third period, and the voltage of the first node may decrease from the first voltage to the ground voltage by resonance based on the inductive load and the resonant capacitor. Accordingly, switching loss may be reduced when power is supplied to the inductive load.

Meanwhile, a power converting device according to another embodiment of the present disclosure and a home appliance including the power converting device may further comprise a first diode connected between the first switching element and the first node and a second diode connected between the second switching element and the second node. Accordingly, a current path may be formed in response to turning on of the first switching element or turning on of the second switching element.

DETAILED DESCRIPTION OF THE PREFERRED EMBODIMENTS

Exemplary embodiments of the present disclosure will be described below in detail with reference to the accompanying drawings.

The terms "module" and "unit" attached to describe the names of components are used herein to aid in the understanding of the components and thus should not be considered as having specific meanings or roles. Accordingly, the terms "module" and "unit" may be used interchangeably.

A home appliance according to one embodiment of the present disclosure is a home appliance having an inductive load and may be applied to cooking apparatus equipped with an inductive heating coil, laundry treatment devices equipped with motors, air conditioners, refrigerators, mobile robots, robot cleaners, vacuum cleaners, water purifiers, drones, vehicles, and so on. In what follows, the present disclosure is described based mainly on the induction cooking apparatus which is one example of the home appliance.

Figure 1:
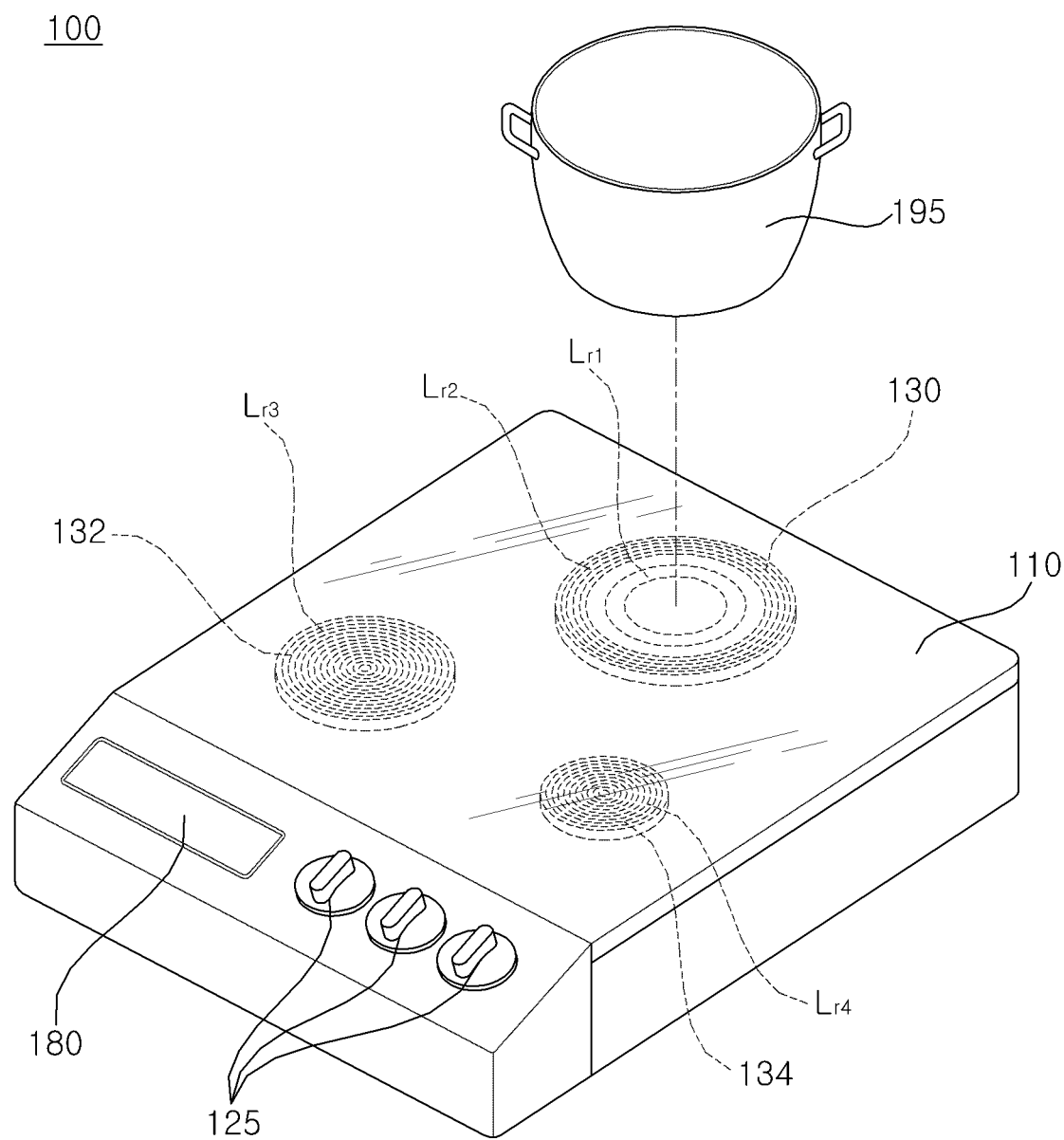
FIG. 1 is a perspective view of an induction cooking apparatus, which is an example of home appliance according to one embodiment of the present disclosure.

FIG. 1 is a perspective view of an induction cooking apparatus according to an embodiment of the present disclosure.

Referring to FIG. 1, the induction cooking apparatus 100 according to the embodiment of the present disclosure may include a heating plate 110, a first heater 130, a second heater 132, a third heater 134, an input device 125 and a display 180.

The heating plate 110 is a casing of the induction cooking apparatus 100 and is disposed on the heaters. The heating plate 110 may be made of various materials such as ceramic or tempered glass.

A cooking vessel is disposed on the heating plate 110 and the cooking vessel 195 is placed on at least one of the heaters 130, 132 or 134 and is heated by the principle of induction heating.

The first heater 130 includes a plurality of induction heating coils and a resonant capacitor (not shown).

In the figure, the first heater 130 includes a first coil Lr1 and a second coil Lr2.

The first coil Lr1 may be an induction heating coil used to detect the temperature of the cooking vessel and the second induction heating coil Lr2 may be used to heat the cooking vessel.

In the figure, the second induction heating coil Lr2 is disposed at the outer circumference of the first induction heating coil Lr1.

When AC current, more particularly, high-frequency AC current, flows in the second induction heating coil Lr2 in a state in which the cooking vessel 195 is placed on the first heater 130, more particularly, the second induction heating coil Lr2, a magnetic field is generated in the second induction heating coil Lr2 by resonance by the resonant capacitor (not shown) and the second induction heating coil Lr2 and eddy current is induced in the cooking vessel 195 in response to electromagnetic induction effect of the magnetic field. By the eddy current, Joule heat is generated in a resistance component of the cooking vessel 195, thereby heating the cooking vessel.

The second heater 132 includes a third induction heating coil Lr3 and a resonant capacitor (not shown). When high-frequency AC current flows in the third induction heating coil Lr3 in a state in which the cooking vessel 195 is placed on the second heater 132, more particularly, the third induction heating coil Lr3, the cooking vessel 195 is heated by eddy current as described above.

The third heater 134 includes a fourth induction heating coil Lr4 and a resonant capacitor (not shown). When high-frequency AC current flows in the fourth induction heating coil Lr4 in a state in which the cooking vessel 195 is placed on the third heater 134, more particularly, the fourth induction heating coil Lr4, the cooking vessel 195 is heated by eddy current as described above.

The input device 125 receives user input so as to operate the induction cooking apparatus 100. For example, whether at least one of the first heater 130, the second heater 132 or the third heater 134 is heated or to which of the first induction heating coil Lr1 and the second induction heating coil Lr2 of the first heater 130 current is supplied is determined or the operation time or temperature of each heater is selected by user input.

The input device 125 is disposed in each of the heaters 130, 132 and 134 as shown in the figure.

The display 180 displays the operation state of the induction cooking apparatus 100. Whether each of the heaters 130, 132 and 134 operates or the temperature of the cooking vessel 195 which is being heated is displayed.

In addition to the induction heat cooking apparatus 100 according to the embodiment of the present disclosure, since a radiant heat cooking apparatus uses a heater under a heating plate 110 similarly to the induction cooking apparatus 100, flame is not generated and thus stability is high. However, since the temperature of the heater increases by radiant heat, on/off control is necessary to protect the heater.

However, since the induction cooking apparatus 100 according to the embodiment of the present disclosure uses the principle of high-frequency induction heating, the heater, more particularly, the induction heating coil, is not directly heated. Since high-frequency current may be continuously supplied, high energy efficiency can be obtained and a heating time can be reduced.

Since the induction cooking apparatus 100 efficiently performs induction heating even in a cooking vessel made of a magnetic material including a metal component, an electrothermal heater (not shown) may be further included in order to heat a cooking vessel made of a non-magnetic material. The electrothermal heater (not shown) may be placed in at least one of the heaters 130, 132 or 134. The induction cooking apparatus 100 may further include a load detector (not shown) for detecting the type of the cooking vessel.

Figure 2:
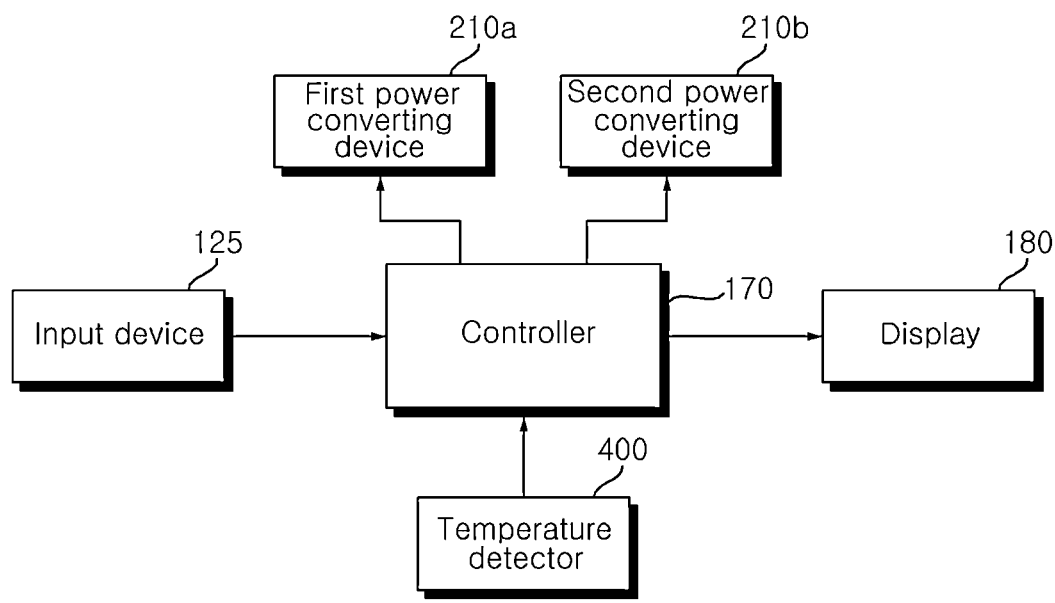
FIG. 2 is a block diagram showing an example of the induction cooking apparatus of FIG. 1.

FIG. 2 is a block diagram showing an example of the induction cooking apparatus of FIG. 1.

Referring to the figure, the induction cooking apparatus 100 may include a first power converting device 210a, a second power converting device 210b, an input device 125, a display 180 and a temperature detector 400.

The first power converting device 210a and the second power converting device 210b may supply power to the plurality of induction heating coils of the cooking apparatus 100.

Figure 3:
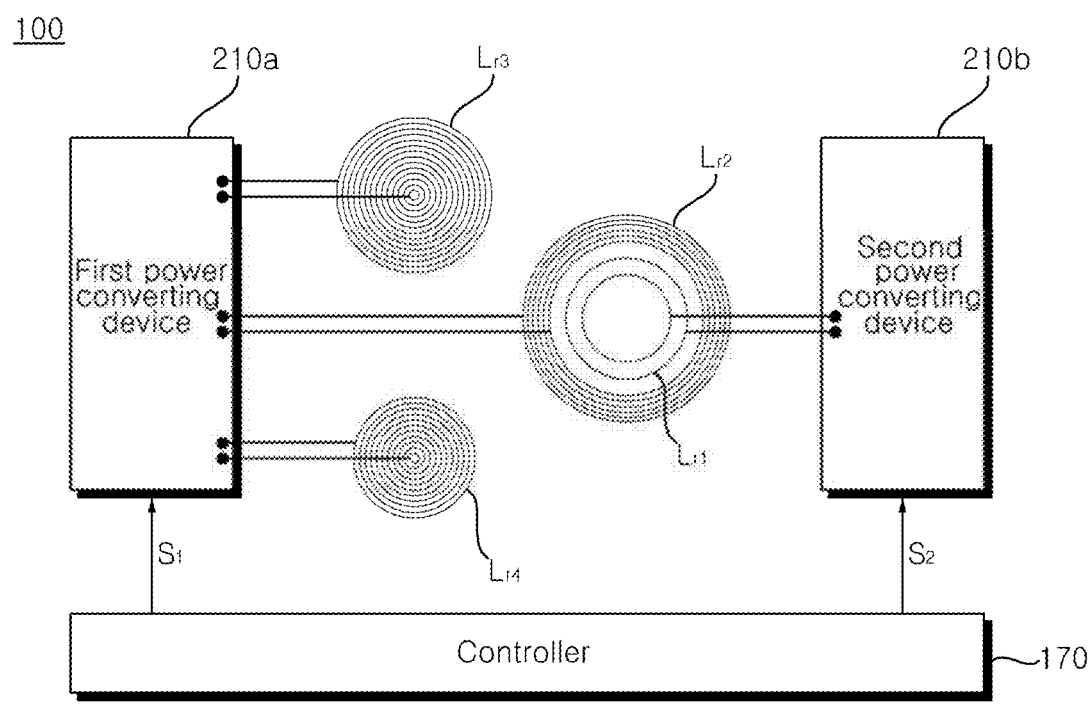
FIG. 3 is a diagram showing an example of supplying power to the induction cooking apparatus of FIG. 1.

In FIG. 3, the first power converting device 210a supplies power to a second induction heating coil Lr2, a third induction heating coil Lr3 and a fourth induction heating coil Lr4 and the second power converting device 210b supplies power to a first induction heating coil Lr1.

The input device 125 may include buttons and a touchscreen related to operation of the cooking apparatus 100 and a signal input through the input device 125 may be transmitted to the controller 170.

The display 180 may display information related to the operation state of the cooking apparatus 100. For example, a cooking time, a residual time, cooking type information and the temperature of a cooking vessel related to cooking may be displayed.

The temperature detector 400 may detect the temperature of the cooking vessel 195. For temperature detection, an IR sensor is generally used. However, in the present disclosure, a method of using a resistor element having a resistance value changed according to temperature is proposed, in consideration of convenience and manufacturing cost reduction. Arrangement of a resistor element will be described with reference to FIG. 5 and subsequent figures thereof.

The controller 170 controls overall operation of the cooking apparatus 100.

For example, the controller 170 may control operations of the first power converting device 210a, the second power converting device 210b, the input device 125, the display 180 and the temperature detector 400.

More specifically, the controller may control the first power converting device 210a or the second power converting device 210b in order to cook food according to a temperature signal input through the input device 125.

The controller 170 may receive temperature information detected by the temperature detector 400 and perform control to display the temperature information on the display 180.

The controller 170 performs control to apply a pulse signal to the first coil Lr1 and detects the temperature of the cooking vessel 195 based on current flowing in the resistor element in correspondence with the pulse signal.

The controller 170 performs control to continuously operate the second coil Lr2 and to repeatedly apply the pulse signal to the first coil Lr1, upon heating the cooking vessel 195.

The controller 170 may perform control to change the width of the pulse signal of the first coil Lr1 or the time for applying the pulse signal according to the operation time of the second coil Lr2 or temperature of the cooking vessel 195.

FIG. 3 is a diagram showing an example of supplying power to the induction cooking apparatus of FIG. 1.

Referring to FIG. 3, the induction cooking apparatus 100 may further include a first power converting device 210a and a second power converting device 210b.

The first power converting device 210a may supply power to a second induction heating coil Lr2 of the first heater 130, a third induction heating coil Lr3 of the second heater 132 and a fourth induction heating coil Lr4 of the third header 134. Here, power may be high-frequency AC power.

The second power converting device 210b may supply power to the first induction heating coil Lr1 of the first heater 130.

Power is supplied from different power supplies to the induction heating coils of the first heater 130, in which the plurality of induction heating coils is disposed, such that the induction cooking apparatus using the high-frequency AC current can be efficiently and stably driven without power reduction.

Figure 4:
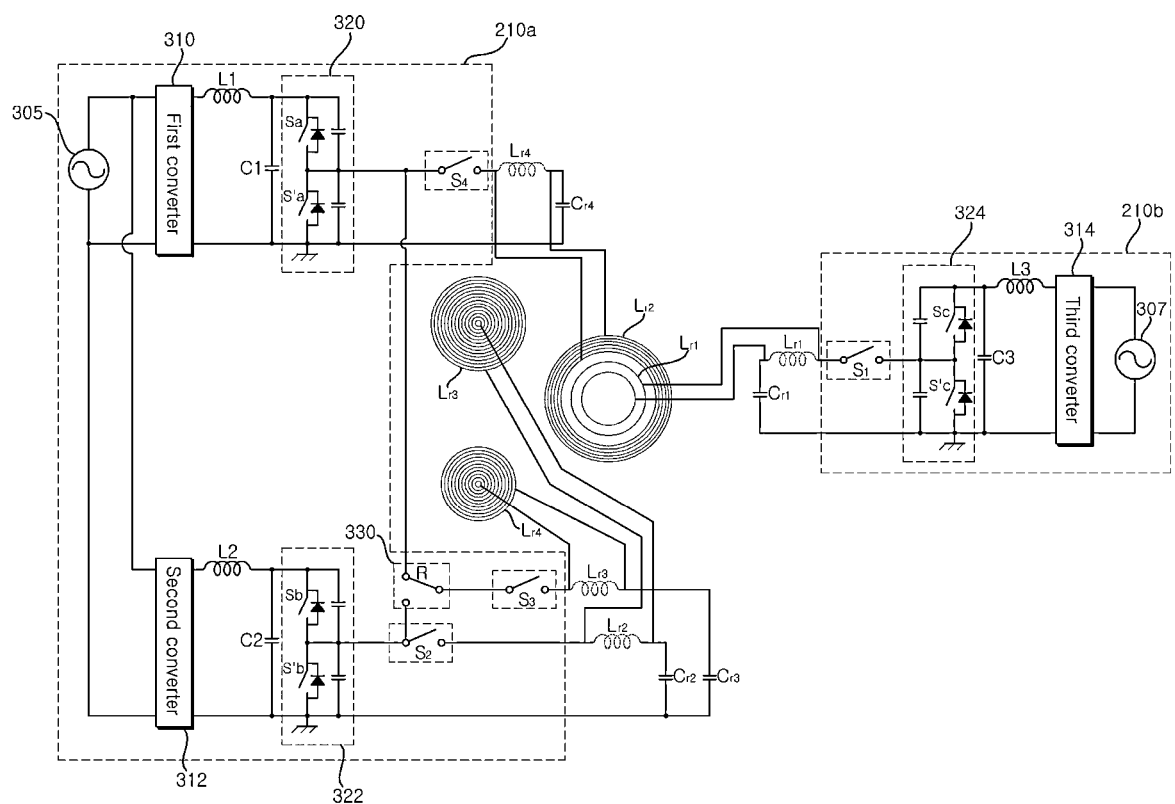
FIG. 4 is a circuit diagram showing an example of the induction cooking apparatus of FIG. 3.

FIG. 4 is a circuit diagram showing an example of the induction cooking apparatus of FIG. 3.

Referring to the figure, the first power converting device 210a according to the embodiment of the present disclosure may include a first converter 310, a second converter 312, a first reactor L1, a second reactor L2, a first smoothing capacitor C1, a second smoothing capacitor C2, a first inverter 320, a second inverter 322, a power selector 330 and second to fourth switching elements S2 to S4.

The second power converting device 210b may include a third converter 314, a third reactor L3, a third smoothing capacitor C3, a third inverter 324 and a first switching element S1.

The first converter 310 and the second converter 312 receive and convert voltages from an AC power source 305 into DC voltages, respectively. For example, the first converter 310 and the second converter 312 may respectively include diodes to output the DC voltages rectified by the diodes.

The first converter 310 and the second converter 312 may respectively include diodes and switching elements and output DC voltages converted based on the rectification of the diodes and the switching operations of the switching elements.

Hereinafter, the first converter 310 and the second converter 312 respectively including the diodes without the switching elements will be focused upon.

The AC power source 305 may be a single-phase AC power source or a three-phase AC power source. In a single-phase AC power source, the first converter 310 and the second converter 312 may include four diodes in the form of a bridge. In a three-phase AC power source, the first converter 310 and the second converter 312 may include six diodes.

The third converter 314 receives and converts the AC voltage into a DC voltage, as in the first converter 310 and the second converter 312. In order to prevent power reduction, the third converter 314 may receive a voltage from a separate AC power 307.

The first reactor L1 and the second reactor L2 are respectively connected to one end of each of the first converter 310 and the second converter 312 to serve to accumulate energy of an AC component to eliminate a harmonic current component or a noise component.

The third reactor L3 is connected to one end of the third converter 314 to serve to accumulate energy of an AC component to eliminate a harmonic current component or a noise component.

The first smoothing capacitor C1 and the second smoothing capacitor C2 are respectively connected to output terminals of the first converter 310 and the second converter 312. In the figure, the reactors L1 and L2 are disposed between the capacitors and the converters 310 and 315.

The first smoothing capacitor C1 and the second smoothing capacitor C2 smooth the rectified voltages output from the first converter 310 and the second converter 312 into DC voltages. Hereinafter, the output terminals of the first converter 310 and the second converter 312 are referred to as first and second dc ends, respectively. The smoothed DC voltages of the first and second dc ends are applied to the first converter 310 and the second converter 312, respectively.

The third capacitor C3 is connected to the output terminal of the third converter 314 and smooths the rectified voltage output from the third converter 312 into a DC voltage. The output terminal of the third converter is referred to as a third dc end.

Each of the first inverter 320, the second inverter 322 and the third inverter 324 includes a plurality of switching elements and converts the smoothed DC voltage into an AC voltage having a predetermined frequency by on/off operation of the switching elements.

The first inverter 320 includes an upper arm switching element Sa and a lower arm switching element S'a connected in series. A diode is connected in inverse-parallel to each switching element Sb or S'b. In addition, a snubber capacitor is connected to each switching element Sa or S'a in parallel.

The switching elements Sa and S'a of the first inverter 320 perform on/off operation based on a first switching control signal from a controller (not shown). At this time, the switching elements Sa and S'a may complementarily operate.

The second inverter 322 includes an upper arm switching element Sb and a lower arm switching element S'b connected in series, similarly to the first inverter 320. A diode is connected in inverse-parallel to each switching elements Sb or S'b. In addition, a snubber capacitor is connected to each switching element Sb or S'b in parallel.

The switching elements Sb and S'b of the first inverter 320 perform on/off operation based on a second switching control signal from the controller (not shown).

The first inverter 320 and the second inverter 322 may separately perform operation. That is, the first and second inverter may generate and output first and second high-frequency AC voltages, respectively.

The third inverter 324 includes an upper arm switching element Sc and a lower arm switching element S'c connected in series, similarly to the first inverter 320. In addition, a diode and a snubber capacitor are further connected.

The fourth resonant capacitor Cr4 may be connected to the second induction heating coil Lr2, for resonance. The high-frequency AC voltage may be supplied to the second induction heating coil Lr2 to induce heating according to the principle of induction heating. At this time, a switching element S4 for determining operation of the second induction heating coil Lr2 may be connected to the second induction heating coil Lr2.

A first AC voltage is supplied from the first inverter 320 to the second induction heating coil Lr2.

The third induction heating coil Lr3 and the fourth induction heating coil Lr4 are connected in parallel to form a pair. A second resonant capacitor Cr2 and a third resonant capacitor Cr3 may be connected to the third induction heating coil Lr3 and the fourth induction heating coil Lr4, for resonance. High-frequency AC voltages may be supplied to the induction heating coils Lr2 and Lr3 to induce heating according to the principle of induction heating. At this time, switching elements S2 and S3 for determining operation of the induction heating coils Lr2 and Lr3 may be connected to the third induction heating coil Lr3 and the fourth induction heating coil Lr4, respectively.

A first AC voltage from the first inverter 320 or a second AC voltage from the second inverter is supplied to the third induction heating coil Lr3 and the fourth induction heating coil Lr4. To this end, the power selector 330 performs switching operation.

The voltage selector 330 selects and supplies any one of the first AC voltage from the first inverter 320 and the second AC voltage from the second inverter 322 to the third induction heating coil Lr3 and supplies the other to the fourth induction heating coil Lr4, when both the third induction heating coil Lr3 and the second induction heating coil Lr2 operate.

For example, the second AC voltage may be supplied to the third induction heating coil Lr3 and the first AC voltage may be supplied to the fourth induction heating coil Lr4.

When three or more of the plurality of induction heating coils connected to the same inverter in parallel are turned on, the AC voltages applied to the induction heating coils may be separated. That is, AC voltages may be supplied from different inverters. Therefore, since the same inverter does not supply the same AC voltage, power reduction does not occur and the AC voltages can be stably supplied.

To this end, the power selector 330 may include a relay element. In the figure, the relay element R is included.

The relay element R is disposed between the inverters 320 and 322 and the fourth induction heating coil Lr4 to perform relay operation, such that the fourth induction heating coil Lr4 is connected to any one of the first inverter 320 and the second inverter 322.

Relay operation of the relay element R may be controlled by a control signal of a controller (not shown).

The first resonant capacitor Cr1 may be connected to the first induction heating coil Lr1, for resonance. A high-frequency AC voltage may be supplied to the first induction heating coil Lr1 to induce heating according to the principle of induction heating. At this time, the switching element S1 for determining operation of the first induction heating coil Lr1 may be connected to first induction heating coil Lr1.

A third AC voltage from the third inverter 324 is supplied to the first induction heating coil Lr1.

The controller (not shown) may control operation of the switching elements Sa and S'a of the first inverter 320, the switching elements Sb and S'b of the second inverter 322, the switching elements Sc and S'c of the third inverter 324, the relay element R of the power selector 330 and the first to fourth switching elements S1 to S4 for operation of the induction heating coils.

In particular, for control of the first inverter 320, the second inverter 322 and the third inverter 324, a pulse width modulation (PWM) switching control signal may be output. When the switching elements of the first inverter 320, the second inverter 322 and the third inverter 324 are insulated gate bipolar transistors (IGBTs), PWM gate drive control signals may be output.

The controller (not shown) may receive respective values from a temperature sensor (not shown) for sensing the temperature of the vicinity of each induction heating coil and an input current detector (not shown) for detecting input current from the AC voltage, and stop overall operation of the induction cooking apparatus 100 upon abnormal operation.

Figure 5A:
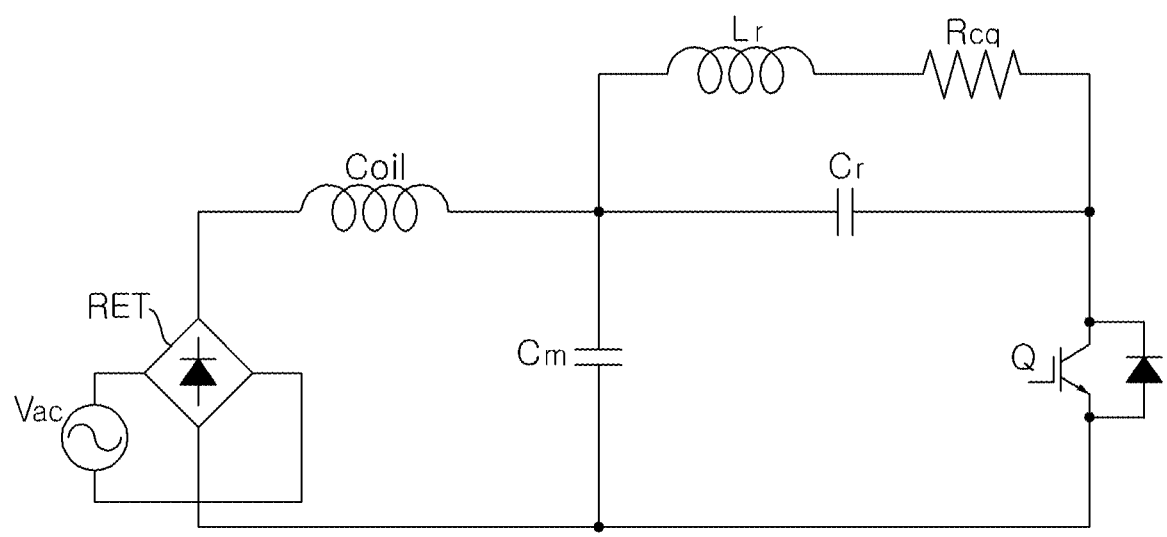
FIGS. 5A to 5C show various examples of a power converting device related to the present disclosure.
Figure 5B:
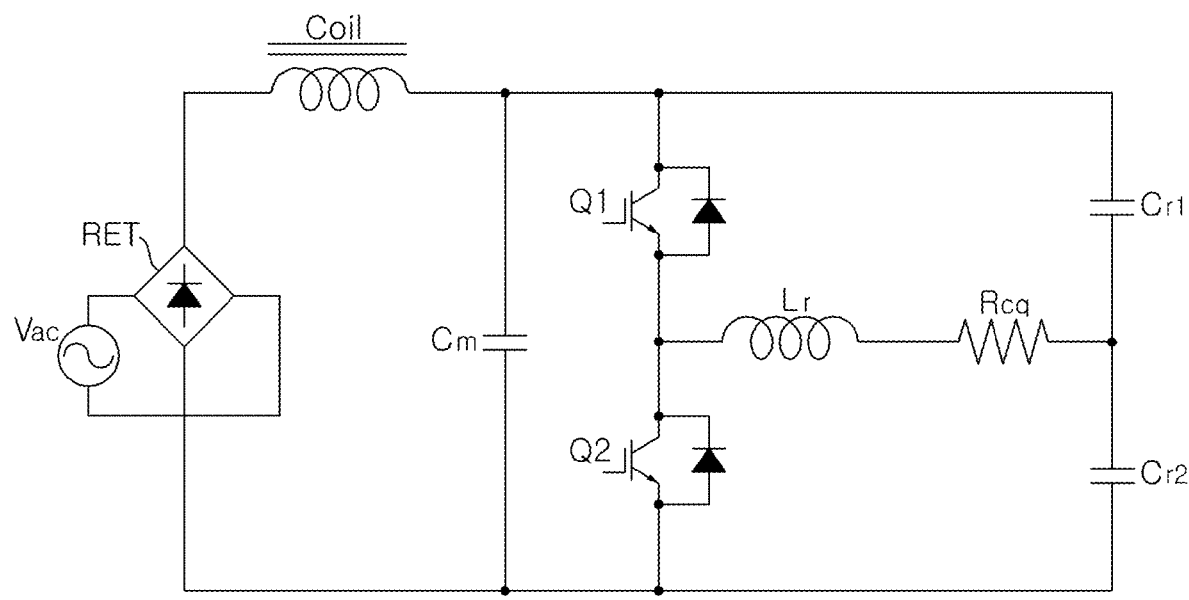
Figure 5C:
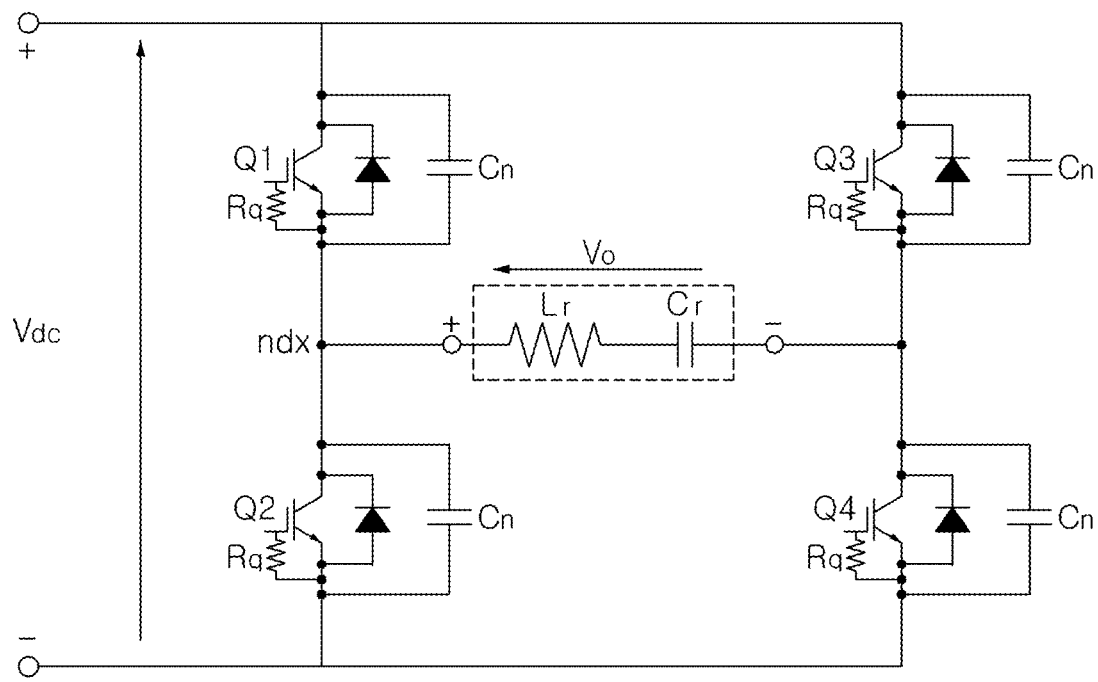

FIGS. 5A to 5C show various examples of a power converting device related to the present disclosure.

First, FIG. 5A shows one example of a circuit diagram of a power converting device 210Xa equipped with a single-ended resonant inverter.

Referring to the figure, the power converting device 210Xa uses a voltage rectified by the rectifier RET and supplies power to the inductive load Lr and the resistor Rcq using a coil, a capacitor Cm, a resonant capacitor Cr, and one switching element Q.

Next, FIG. 5B shows one example of a circuit diagram of a power converting device 210Xb equipped with a half-bridge resonant inverter.

Referring to the figure, the power converting device 210Xb uses a voltage rectified by the rectifier RET and supplies power to the inductive load Lr and the resistor Rcq using a coil, a capacitor Cm, one pair of capacitors Cr1, Cr2, and one pair of switching elements Q1, Q2 in the half-bridge structure.

Next, FIG. 5C shows one example of a circuit diagram of a power converting device 210Xc equipped with a full-bridge resonant inverter.

Referring to the figure, the power converting device 210Xc supplies power to the inductive load Lr and the resonant capacitor Cr using a DC voltage Vdc and two pairs of switching elements Q1, Q2, Q3, Q4 in the full-bridge structure.

However, when the power converting device 210Xa equipped with a single-ended resonant inverter and the power converting device 210Xb equipped with a half-bridge resonant inverter are used, the operating frequency is low, which accordingly affects the sizes of the resonant capacitor and the resonant inductor to become large. In addition, since the internal voltage of a switching element is high, there are high chances of burnout of the switching element, and significant switching loss may occur.

Meanwhile, when the power converting device 210Xc equipped with a full-bridge resonant inverter is used, there are high chances of burnout of the switching element since the internal voltage of a switching element is high, and significant switching loss may occur.

Accordingly, the present disclosure proposes a method for reducing the internal voltage of a switching element while reducing the switching loss.

Figure 6:
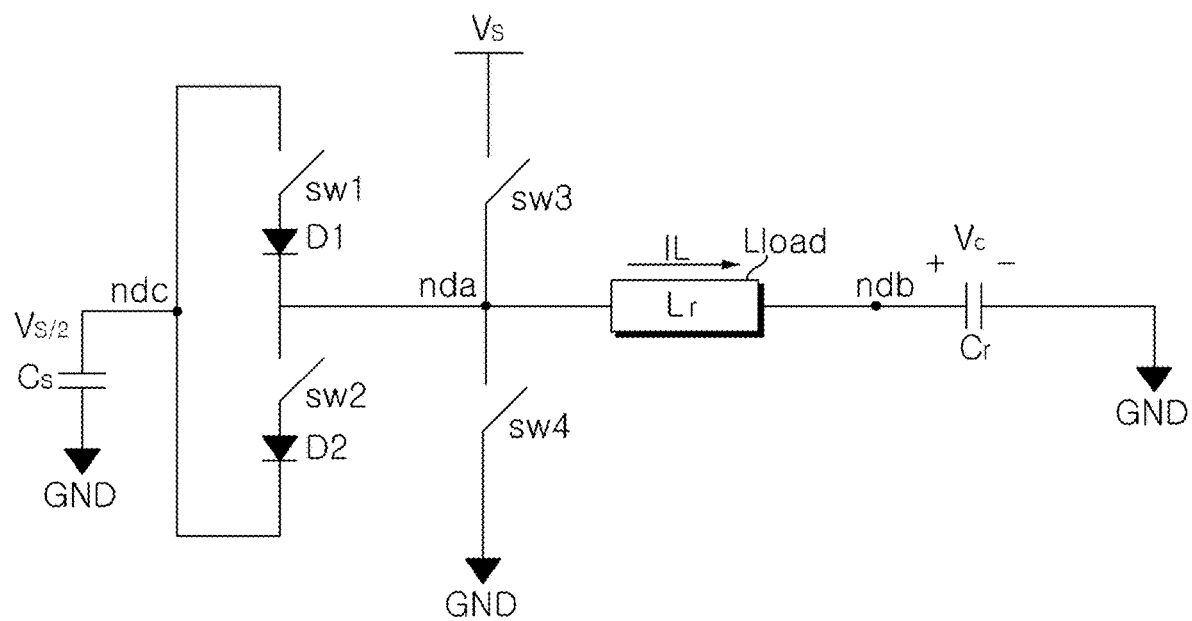
FIG. 6 is a circuit diagram of a power converting device according to one embodiment of the present disclosure.

FIG. 6 is a circuit diagram of a power converting device according to one embodiment of the present disclosure, and FIGS. 7 to 11 are drawings referenced for the description of the power converting device of FIG. 6.

First, referring to FIG. 6, a power converting device 210 according to an embodiment of the present disclosure comprise a first capacitor Cs storing a first voltage 0.5 Vs, a first switching element SW1 turned on to output the first voltage 0.5 Vs stored in the first capacitor Cs to a first node nda which is one end of an inductive load Lr, a second switching element SW2, one end of which is connected to the first switching element SW1 and which is turned on to decrease the voltage of the first node nda to the first voltage 0.5 Vs, a third switching element SW3 turned on to output a second voltage Vs greater than the first voltage 0.5 Vs to the first node nda which is one end of the inductive load Lr, and a fourth switching element SW4, one end of which is connected to the third switching element SW3 and which is turned on to decrease the voltage of the first node nda to the ground voltage GND.

Accordingly, switching loss may be reduced when power is supplied to the inductive load Lr. Also, internal voltage of the switching elements may be reduced when power is supplied to the inductive load Lr.

Also, high-speed switching of the first to fourth switching elements SW1 to SW4 is made possible.

For example, the switching frequency of the switching elements Q1 to Q4 within the power converting device 210Xc of FIG. 5C may be approximately 30 KHz, but the switching frequency of the first to fourth switching elements SW1 to SW4 of FIG. 6 may increase to approximately 200 KHz.

Meanwhile, in response to the resonance caused by the inductive load Lr and the resonant capacitor Cr, the maximum resonant voltage compared to the input voltage may be supplied to the inductive load Lr.

Meanwhile, the power converting device 210 according to an embodiment of the present disclosure may further include a resonant capacitor Cr disposed between the other end ndb of the inductive load Lr and the ground GND. Accordingly, it is possible to supply maximum power to the inductive load Lr using resonance.

Meanwhile, the power converting device 210 according to the embodiment of the present disclosure may further include a first diode D1 connected between the first switching element SW1 and the first node nda and a second diode D2 connected between the second switching element SW2 and the second node ndc. Accordingly, it is possible to form a current path in response to turning on of the first switching element SW1 or turning on of the second switching element SW2.

As shown in the figure, the anode of the first diode D1 may be connected to the second node ndc, the cathode of the first diode D1 may be connected to the first node nda, the cathode of the second node ndc may be connected to the second node ndc, and the anode of the second diode D2 may be connected to the first node nda.

Accordingly, when the first switching element SW1 is turned on, the first diode D1 conducts a current, and the current flows through the first switching element SW1 in the direction from the capacitor Cs to the first diode D1. However, no current flows in the direction of the second diode D2.

Meanwhile, when the second switching element SW2 is turned on, the second diode D2 conducts a current, and the current flows through the second switching element SW2 in the direction from the second diode D2 to the capacitor Cs. However, no current flows in the direction of the first diode D1.

Meanwhile, a power converting device 210 according to another embodiment of the present disclosure comprises a first switching element SW1 and a second switching element SW2 connected in series with each other, a first capacitor Cs, one end of which is connected to the first switching element SW1 and which stores a first voltage 0.5 Vs, an inductive load Lr connected to a first node nda between the first switching element SW1 and the second switching element SW2, and a third switching element SW3 and a fourth switching element SW4 connected in series with each other, wherein a second voltage source being connected to the first node nda and supplying a second voltage to the third switching element SW3 is connected between the third switching element SW3 and the fourth switching element SW4, and the voltage of the first node nda increases step by step based on sequential turning on of the first switching element SW1 and the third switching element SW3. Accordingly, switching loss may be reduced when power is supplied to an inductive load Lr. Also, internal voltage of the switching elements may be reduced when power is supplied to the inductive load Lr.

Meanwhile, the voltage of the first node nda may increase to the first voltage 0.5 Vs in response to turning on of the first switching element SW1 and increase from the first voltage 0.5 Vs to the second voltage Vs in response to turning on of the third switching element SW3. Accordingly, switching loss may be reduced when power is supplied to the inductive load Lr.

Meanwhile, the voltage of the first node nda may decrease step by step based on sequential turning on of the second switching element SW2 and the fourth switching element SW4. Accordingly, switching loss may be reduced when power is supplied to the inductive load Lr.

Meanwhile, the voltage of the first node nda may decrease from the second voltage Vs to the first voltage 0.5 Vs in response to turning on of the second switching element SW2 and may decrease from the first voltage 0.5 Vs to the ground voltage GND in response to turning on of the fourth switching element SW4.

Figure 7:
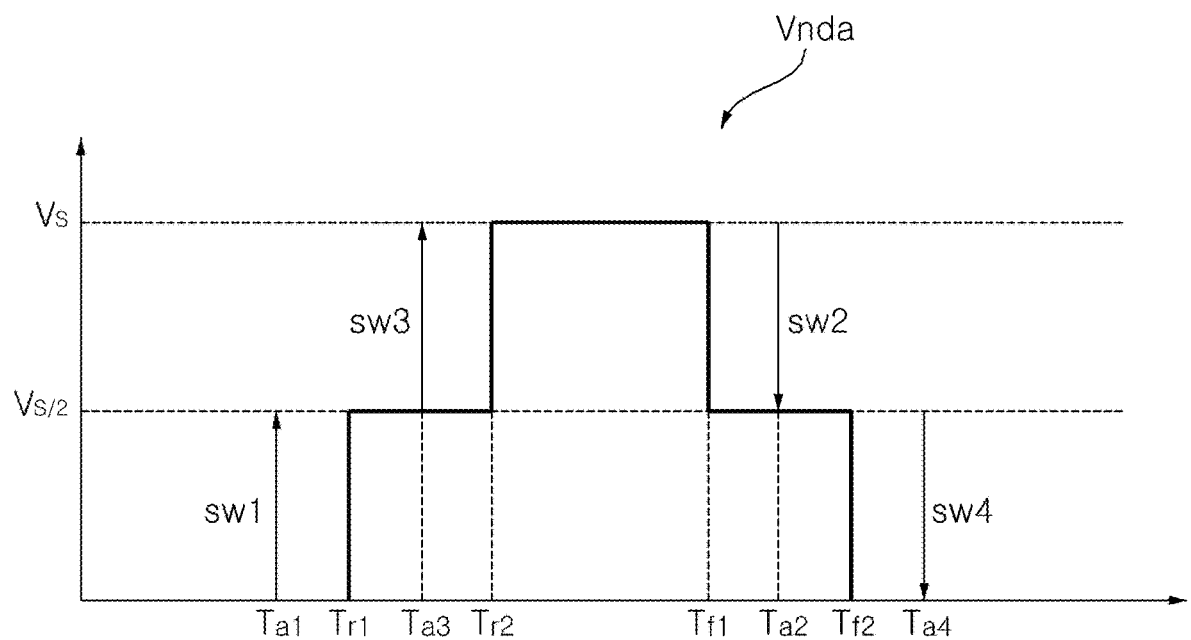
FIGS. 7 to 11 are drawings referenced for the description of the power converting device of FIG. 6.

FIG. 7 shows a turn-on timing of the respective switching elements SW1 to SW4 within the power converting device 210 of FIG. 6 and a timing diagram illustrating voltage change of the first node nda in response to the turn-on timing.

Referring to the figure, meanwhile, the first switching element SW1 may be turned on at the first time point Ta1, the voltage of the first node nda may increase from the ground voltage to the first voltage 0.5 Vs at the time point Tr1, the third switching element SW3 may be turned on at the second time point Ta3 after the first time point Ta1, the voltage of the first node nda may increase from the first voltage 0.5 Vs to the second voltage Vs at the time point Tr2, the second switching element SW2 may be turned on at the third time point Ta2 after the second time point Ta3, the voltage of the first node nda may decrease from the second voltage Vs to the first voltage 0.5 Vs at the time point Tf1, the fourth switching element SW4 may be turned on at the fourth time point Ta4 after the third time point Ta2, and the voltage of the first node nda may decrease from the first voltage 0.5 Vs to the ground voltage GND. Accordingly, switching loss may be reduced when power is supplied to the inductive load Lr.

As shown in the figure, when the voltage of the first node nda increases from the ground voltage to the second voltage Vs, since the voltage increases in a stepwise manner through the first voltage 0.5 Vs, the level of an instantaneous current is lowered when the first switching element SW1 or the third switching element SW3 is turned on. Accordingly, switching loss is reduced.

Similarly, when the voltage of the first node nda falls from the second voltage Vs to the ground voltage, since the voltage decreases in a stepwise manner through the first voltage 0.5 Vs, the level of an instantaneous current is lowered when the second switching element SW2 or the fourth switching element SW4 is turned on. Therefore, switching loss is reduced.

Figure 8A:
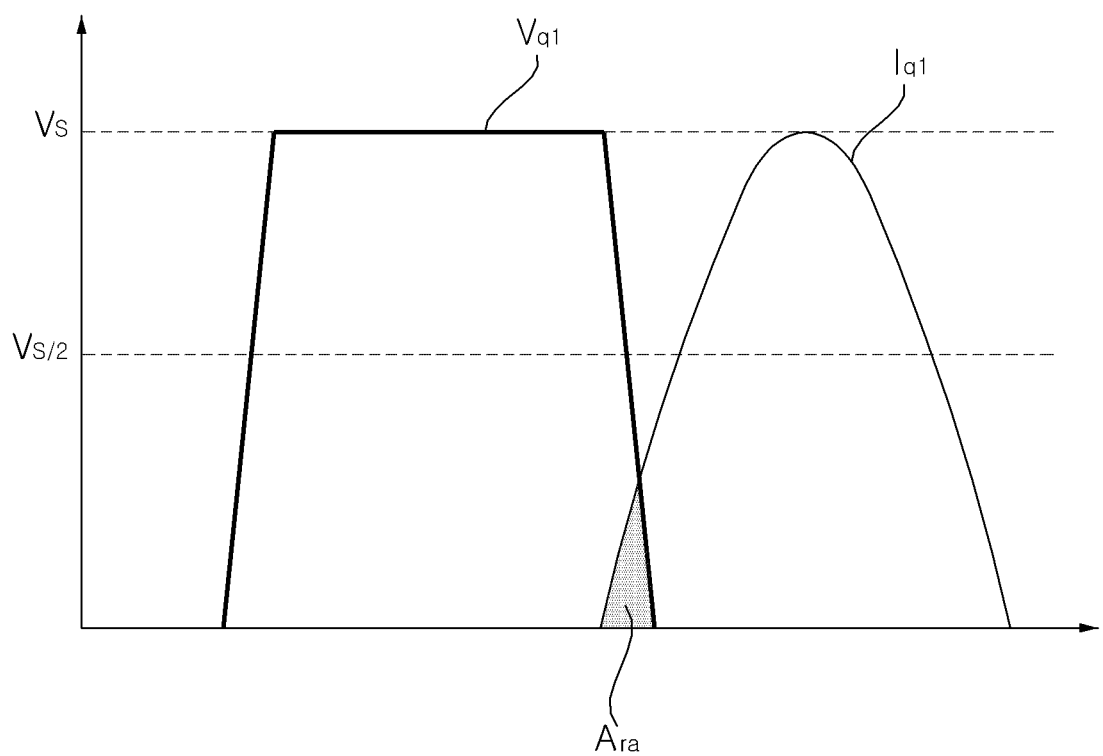

FIG. 8A shows a voltage Vq1 across a switching element Q1 within the power converting device 210Xc equipped with a full-bridge resonant inverter of FIG. 5C and a current Iq1 flowing through the switching element.

Referring to the figure, the switching element Q1 within the power converting device 210Xc is turned on to supply the second voltage Vs to the inductive load Lr. Accordingly, a voltage waveform increases rapidly from the ground voltage to the second voltage Vs, as shown in the figure.

In addition, the current Iq1 flowing through the switching element Q1 is temporarily increased when the voltage decreases based on a time delay caused by the inductive load Lr, and a partially overlapping area Ara is developed between the voltage Vq1 across the switching element and the current Iq1.

The overlapping area Ara represents the power consumed by the switching element Q1 and appears as switching loss.

Figure 8B:
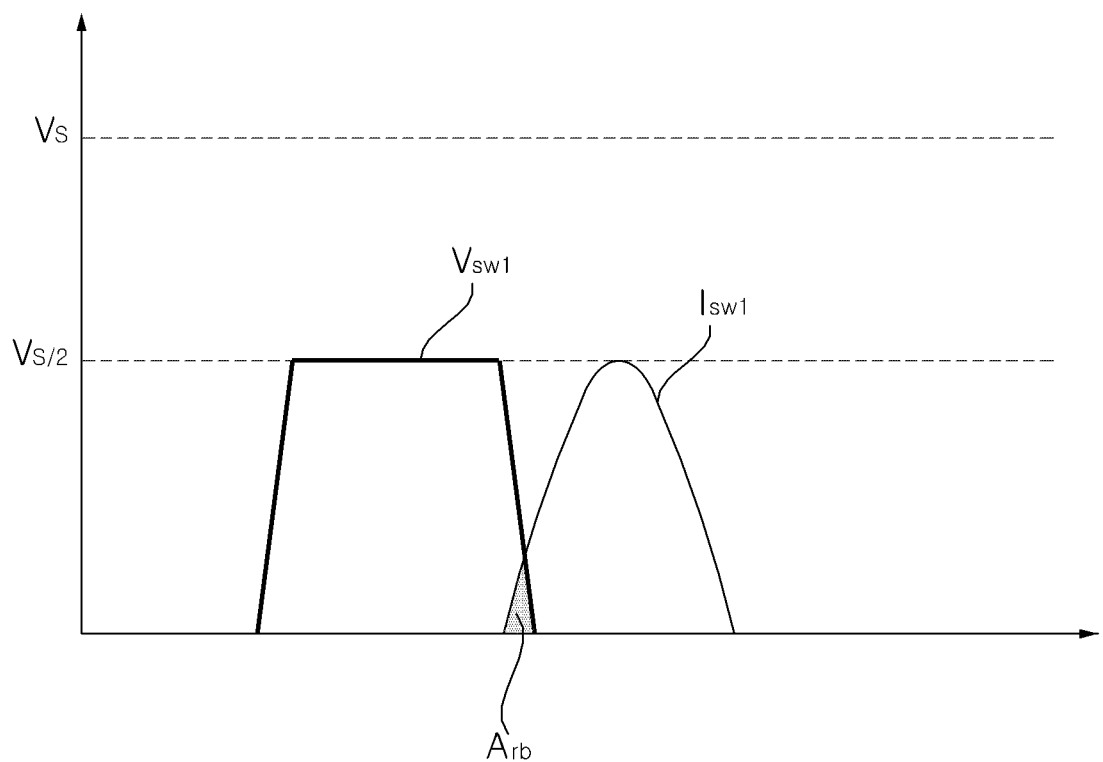

FIG. 8B shows a voltage Vsw1 across the first switching element SW1 within the power converting device 210 of FIG. 6 according to an embodiment of the present disclosure and a current Isw1 flowing through the first switching element SW1.

Referring to the figure, the first switching element SW1 within the power converting device 210 is turned on to supply the first voltage 0.5 Vs to the inductive load Lr. Accordingly, a voltage waveform increases rapidly from the ground voltage to the first voltage 0.5 Vs, as shown in the figure.

In addition, the current Isw1 flowing through the first switching element SW1 is temporarily increased when the voltage decreases based on a time delay caused by the inductive load Lr, and a partially overlapping area Arb is developed between the voltage Vsw1 across the first switching element SW1 and the current Isw1.

The overlapping area Arb represents the power consumed by the first switching element SW1 and appears as switching loss.

However, since the overlapping area Arb of FIG. 8B is smaller than the overlapping area Ara of FIG. 8A, switching loss may be reduced.

Meanwhile, since the internal voltage of the first switching element SW1 of FIG. 8B is approximately 0.5 Vs, the voltage of the first switching element SW1 is reduced to about half the internal voltage Vs of the switching element Q1. Therefore, the internal voltage of the first switching element SW1 of FIG. 8B is reduced.

Figure 9A:
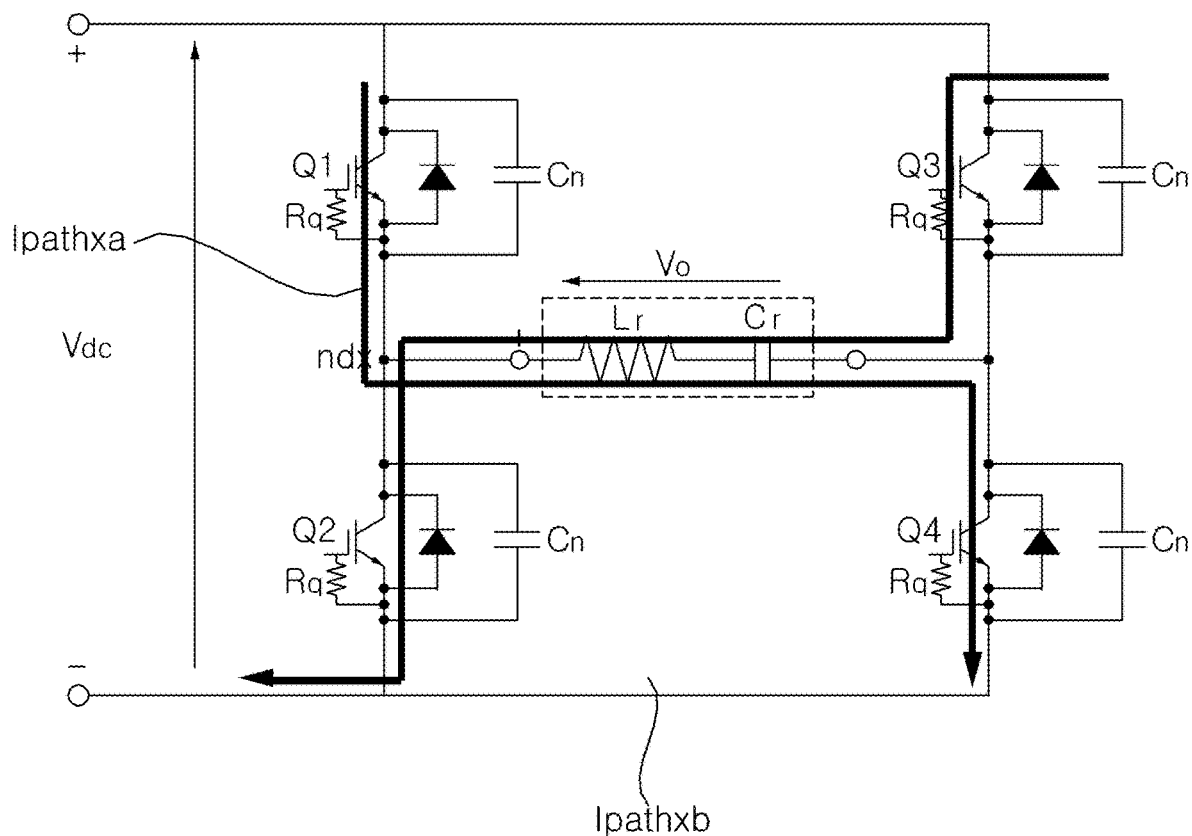

FIG. 9A shows a current path in response to turning on of switching elements Q1, Q3 within the power converting device 210Xc equipped with the full-bridge resonant inverter of FIG. 5C.

Referring to the figure, first, the first switching element Q1 and the fourth switching element Q4 are turned on, a current path is formed accordingly, indicated by Ipathxa, the voltage at one end of the inductive load Lr increases from the ground voltage to Vs voltage, and maintains the voltage approximately at Vs.

Next, the second switching element Q2 and the third switching element Q3 are turned on, a current path is formed accordingly, indicated by Ipathxb, and the voltage at one end nd of the inductive load Lr decreases from the voltage Vs to the ground voltage.

Meanwhile, according to the method of FIG. 9A, as described with reference to FIG. 8A, disadvantages are caused that switching loss increases, and the internal voltage of the switching element becomes large.

Figure 9B:
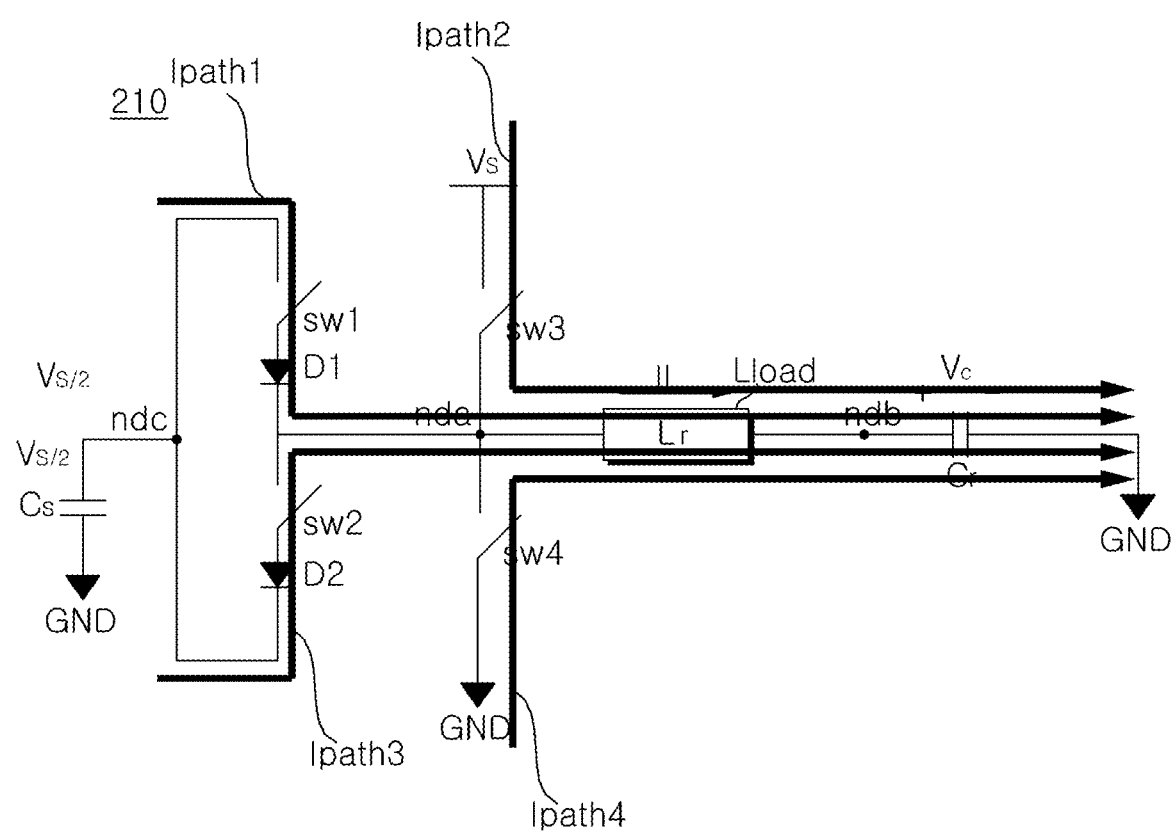

FIG. 9B shows a current path in response to turning on of switching elements SW1 to SW4 within the power converting device 210 of FIG. 6 according to an embodiment of the present disclosure.

Referring to the figure, the first switching element SW1 is turned on at the time point Ta1. Accordingly, a current path Ipath1 is formed, which flows through the capacitor Cs, the first switching element SW1, the first diode D1, the inductive load Lr, and the resonant capacitor Cr.

Based on the resonant current path, the voltage of the first node nda increases from the ground voltage to the first voltage 0.5 Vs.

Next, the third switching element SW3 is turned on at the second time point Ta3 after the first time point Ta1. Accordingly, a current path Ipath2 is formed, which flows through the second voltage source, the third switching element SW3, the inductive load Lr, and the resonant capacitor Cr.

Based on the resonant current path, the voltage of the first node nda increases from the first voltage 0.5 Vs to the second voltage Vs.

Next, the second switching element SW2 is turned on at the third time point Ta2 after the second time point Ta3. Accordingly, a current path Ipath3 is formed, which flows through the capacitor Cs, the second switching element SW2, the second diode D2, the inductive load Lr, and the resonant capacitor Cr.

Based on the resonant current path, the voltage of the first node nda decreases from the first voltage 0.5 Vs to the ground voltage.

Next, the fourth switching element SW4 is turned on at the fourth time point Ta4 after the third time point Ta2. Accordingly, a current path Ipath4 is formed, which flows through the ground, the fourth switching element SW4, the inductive load Lr, and the resonant capacitor Cr.

Based on the resonant current path, the voltage of the first node nda decreases from the first voltage 0.5 Vs to the ground voltage.

Figure 10A:
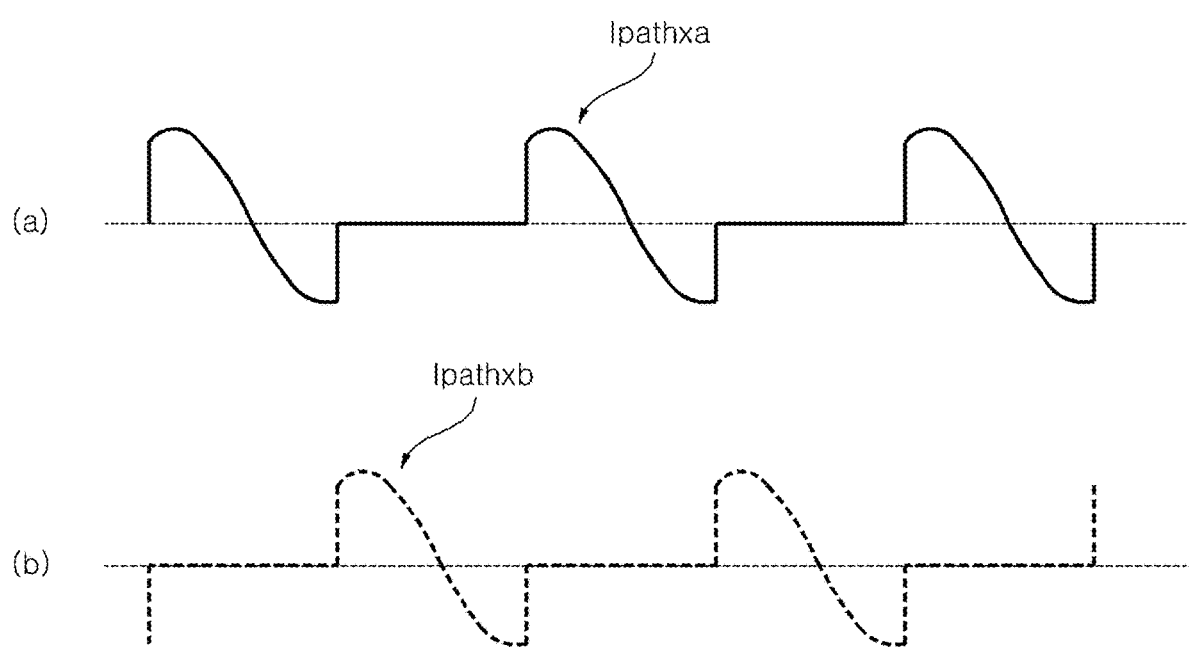

FIG. 10A(a) illustrates a current waveform flowing through the first switching element Q1 in relation to the current path Ipathxa of FIG. 9A, and FIG. 10A(b) illustrates a current waveform flowing through the third switching element Q3 in relation to the current path Ipathxb of FIG. 9A.

Figure 10B:
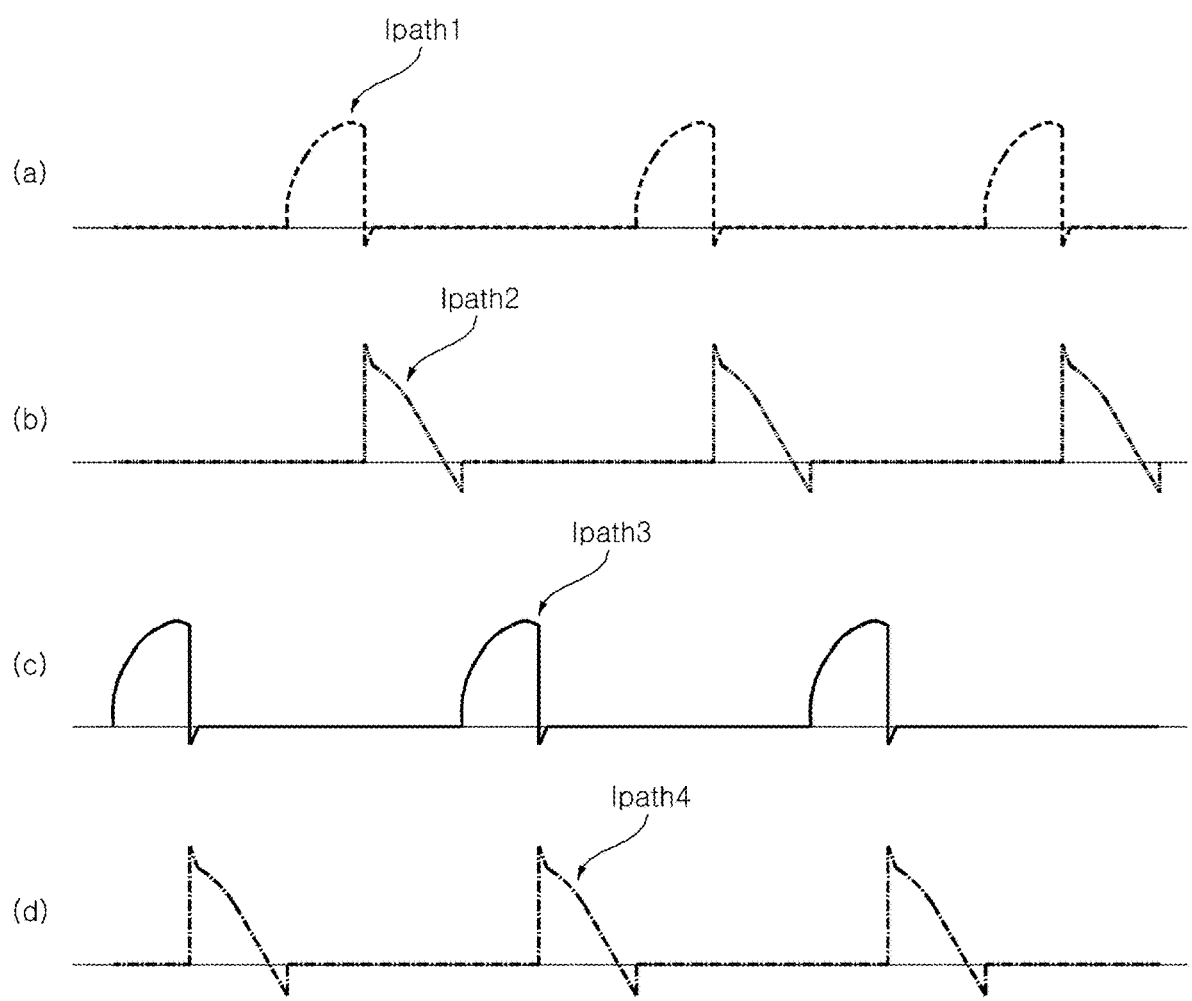

FIG. 10B(a) shows a current waveform flowing through the first switching element SW1 in relation to the current path Ipath1 of FIG. 9B, FIG. 10B(b) shows a current waveform flowing through the third switching element SW3 in relation to the current path of Ipath2 of FIG. 9B, FIG. 10B(c) shows a current waveform flowing through the second switching element SW2 in relation to the current path of Ipath3 of FIG. 9B, and FIG. 10B(d) shows a current waveform flowing through the fourth switching element SW4 in relation to the current path of Ipath4 of FIG. 9B.

Figure 10C:
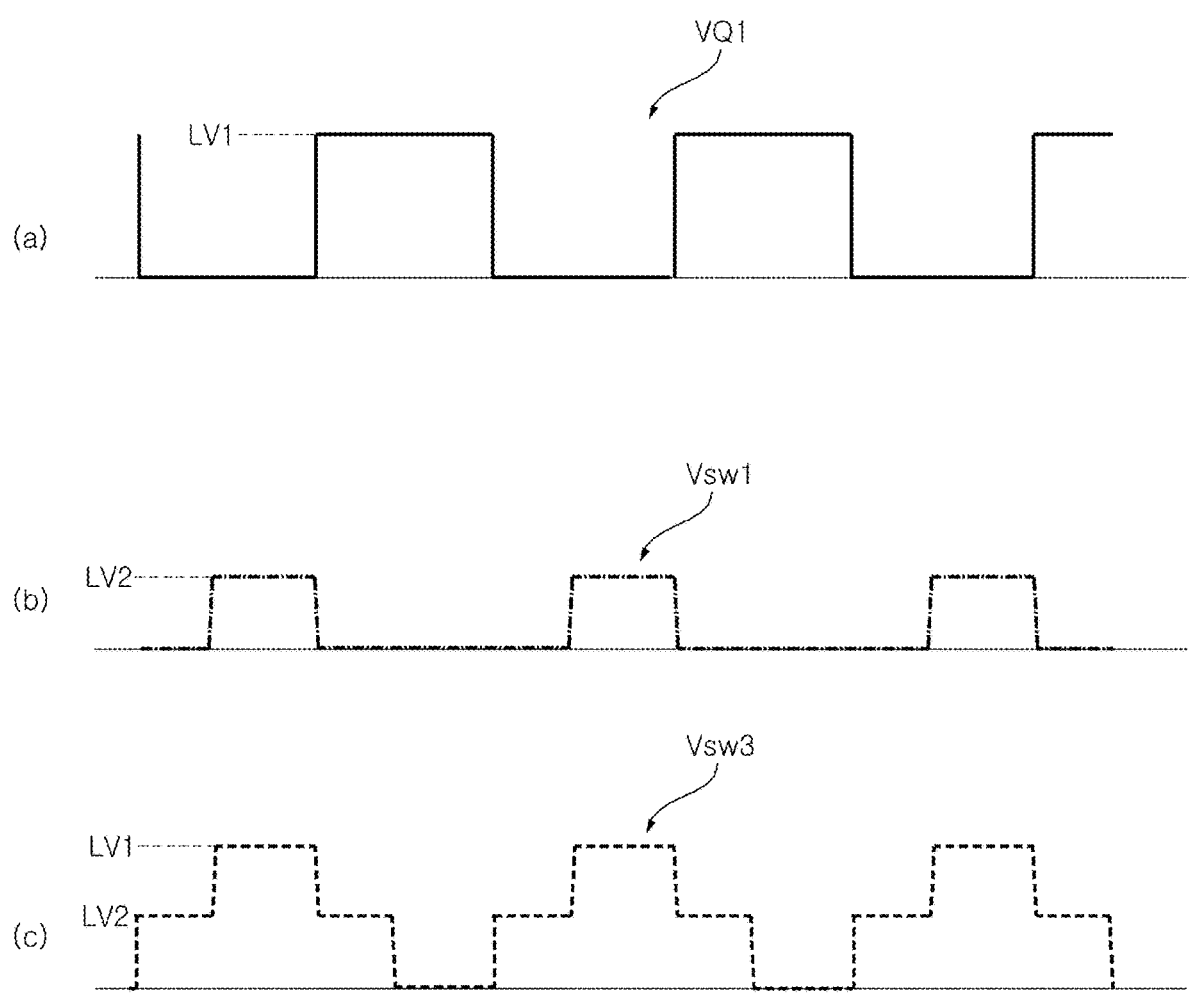

FIG. 10C(a) shows a voltage waveform VQ1 of the first switching element Q1 of FIG. 9A, FIG. 10C(b) shows a voltage waveform Vsw1 of the first switching element SW1 of FIG. 9B, and FIG. 10C(c) shows a voltage waveform Vsw3 of the third switching element SW3 of FIG. 9B.

The maximum level of the voltage waveform VQ1 of the first switching element Q1 of FIG. 10C(a) is LV1, which is approximately two times as large as the maximum level Lv2 of the voltage waveform Vsw1 of the first switching element SW1 of FIG. 10C(b).

Therefore, the internal voltage of the first switching element SW1 within the power converting device 210 according to an embodiment of the present disclosure is lowered to approximately half the internal voltage of the first switching element Q1 within the power converting device 210Xc equipped with a full-bridge inverter.

Meanwhile, the voltage waveform Vsw3 of the third switching element SW3 of FIG. 10C(c) shows that the voltage increases in a stepwise manner from Lv2 to Lv1 or decreases in a stepwise manner from Lv1 to Lv2; therefore, the internal voltage is lowered compared to the first switching element Q1 within the power converting device 210Xc equipped with a full-bridge inverter.

Figure 10D:
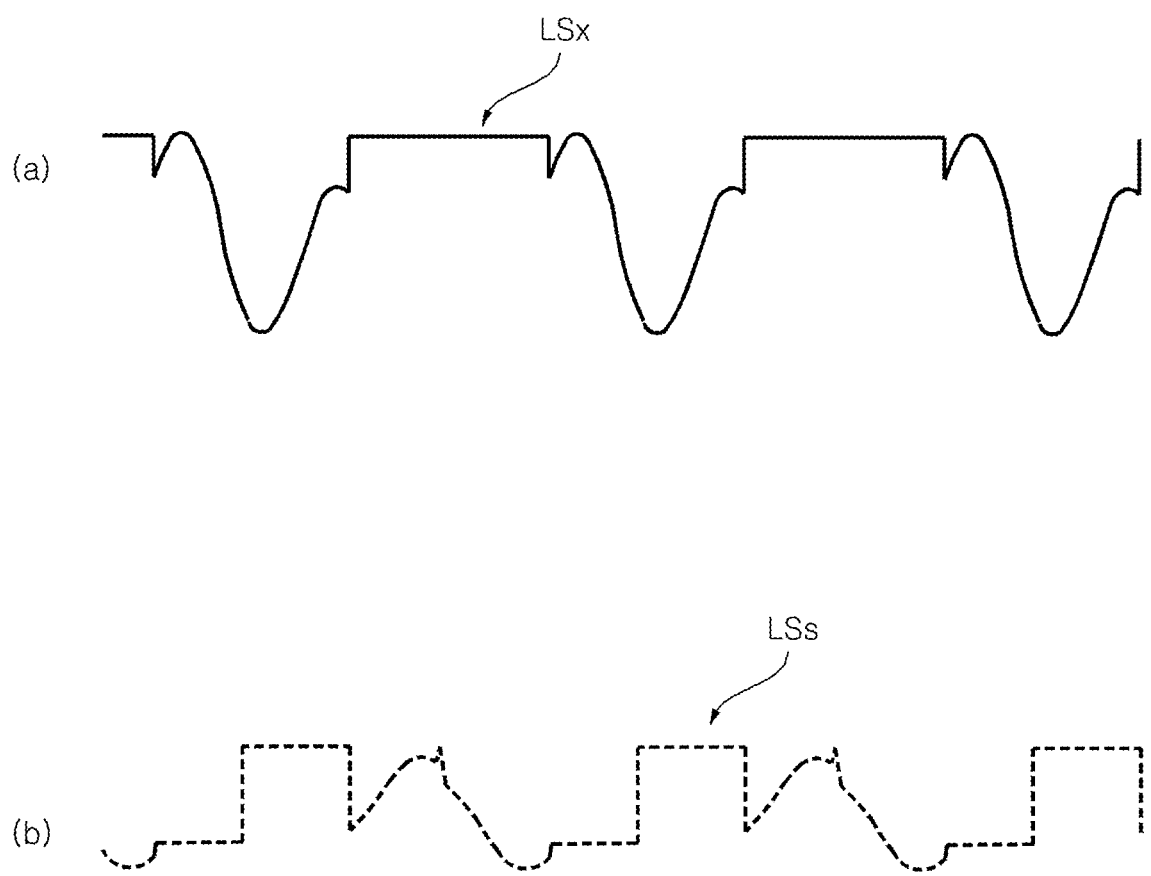

FIG. 10D(a) shows a switching loss waveform LSx of the first switching element Q1 of FIG. 9A, and FIG. 10D(b) shows a switching loss waveform LSs of the first switching element SW1 of FIG. 9B.

The switching loss waveform LSx of FIG. 10D(a) and the switching loss waveform LSs of FIG. 10D(b) may represent a consumed power waveform of the switching element.

Referring to the figure, it may be seen that the level of the switching loss waveform LSs of FIG. 10D(b) is lower compared to the switching loss waveform LSx of FIG. 10D(a).

In other words, according to the power converting device 210 according to an embodiment of the present disclosure, switching loss may be reduced when power is supplied to the inductive load Lr.

Figure 11:
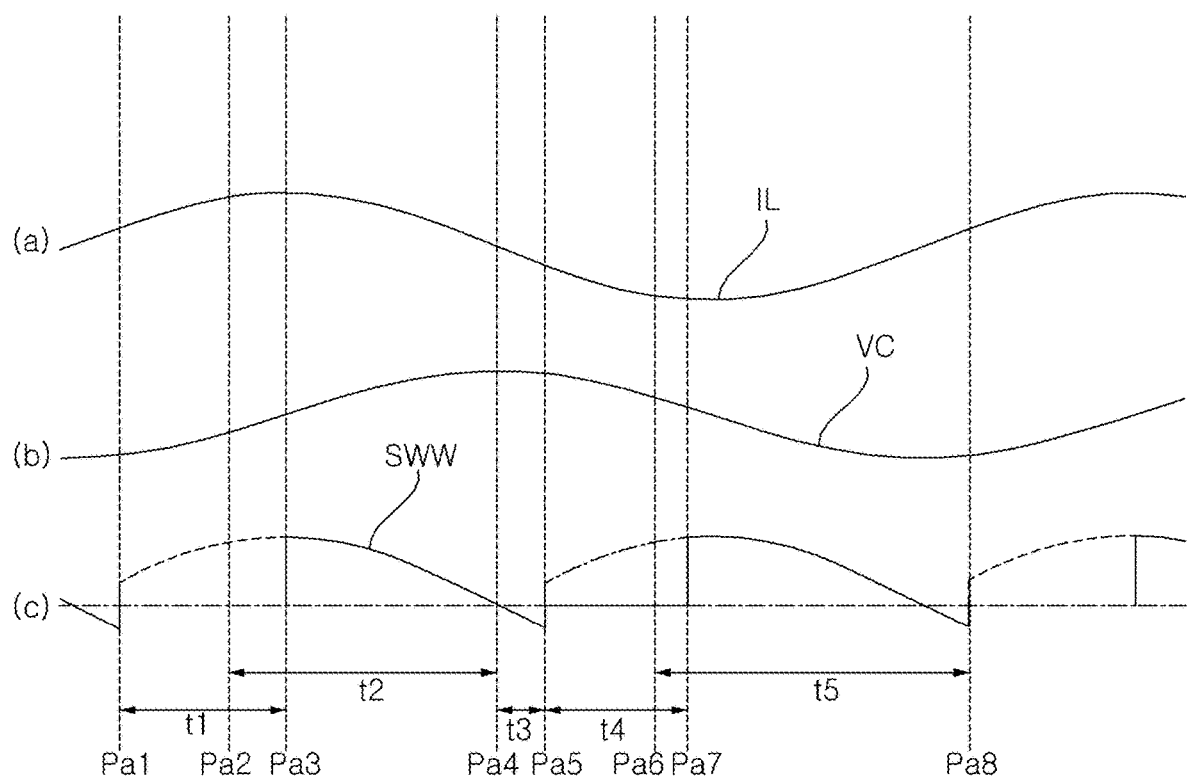

FIG. 11(*a*) shows a current waveform IL flowing through an inductive load Lr, FIG. 11(*b*) shows a voltage Vc across a resonant capacitor Cr, and FIG. 11(*c*) shows a switching sequence SWW in response to turning on of switching elements SW1 to SW4 within the power converting device 210 of FIG. 9.

A predetermined phase difference occurs between a current waveform IL flowing through the inductive load Lr and a voltage Vc across the resonant capacitor Cr.

Meanwhile, according to the switching sequence SWW of FIG. 11(c), the first switching element SW1 may be turned on during a first period t1, the voltage of the first node nda may increase to the first voltage 0.5 Vs due to the resonance based on the inductive load Lr and the resonant capacitor Cr, the third switching element SW3 may be turned on during a second period t2, part of which overlaps the first period t1, and the voltage of the first node nda may increase from the first voltage 0.5 Vs to the second voltage Vs due to the resonance based on the inductive load Lr and the resonant capacitor Cr. Accordingly, switching loss may be reduced when power is supplied to the inductive load Lr.

At this time, the overlapping period may be approximately 0.1 times the turn-on period of the first switching element SW1 or the third switching element SW3.

Meanwhile, the second switching element SW2 may be turned on during a third period t3 separated from the second period t2, the voltage of the first node nda may decrease from the second voltage Vs to the first voltage 0.5 Vs due to the resonance based on the inductive load Lr and the resonant capacitor Cr, the fourth switching element SW4 may be turned on during a fourth period t4, part of which overlaps the third period t3, and the voltage of the first node nda may decrease from the first voltage 0.5 Vs to the ground voltage GND due to the resonance based on the inductive load Lr and the resonant capacitor Cr. Accordingly, switching loss may be reduced when power is supplied to the inductive load Lr.

At this time, the overlapping period may be approximately 0.1 times the turn-on period of the second switching element SW2 or the fourth switching element SW4.

Meanwhile, the power converting device 210 according to an embodiment of the present disclosure may control the operation to supply the maximum energy across the inductive load Lr by controlling the frequency value even if an input voltage (for example, Vs) is low.

In other words, the power converting device may control the frequency to increase in proportion to the decrease of an input voltage so that the maximum energy is supplied across the inductive load Lr.

Meanwhile, the power converting device 210 according to an embodiment of the present disclosure may minimize the design of a noise filter by minimizing conduction noise.

Also, throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

INDUSTRIAL APPLICABILITY

The present disclosure may be applied to a power converting device and home appliances including the power converting device. More specifically, the present disclosure may be applied to a power converting device capable of reducing switching loss when power is supplied to an inductive load and home appliances including the power converting device.

What is claimed is:
1. A power converting device, the device comprising:
a first capacitor;
a first switching element turned on to output a first voltage stored in the first capacitor to a first node which is one end of an inductive load;
a second switching element, one end of which is connected to the first switching element and which is turned on to decrease the voltage of the first node to the first voltage;
a third switching element turned on to output a second voltage greater than the first voltage to the first node which is one end of the inductive load;
a fourth switching element, one end of which is connected to the third switching element and which is turned on to decrease the voltage of the first node to the ground voltage;
a resonant capacitor coupled between the other end of the inductive load and the ground,
wherein in response to the first switching element being turned on during a first period, the voltage of the first node increases to the first voltage by resonance based on the inductive load and the resonant capacitor, and
wherein, in response to the third switching element being turned on during a second period, part of which overlaps the first period, and the voltage of the first node increases from the first voltage to the second voltage by resonance based on the inductive load and the resonant capacitor.

2. The device of claim 1, wherein the first switching element is turned on at a first time point to increase the voltage of the first node to the first voltage,
the third switching element is turned on at a second time point after the first time point to increase the voltage of the first node from the first voltage to the second voltage,
the second switching element is turned on at a third time point after the second time point to decrease the voltage of the first node from the second voltage to the first voltage, and
the fourth switching element is turned on at a fourth time point after the third time point to decrease the voltage of the first node from the first voltage to the ground voltage.

3. The device of claim 1, wherein in response to the second switching element being turned on during a third period separated from the second period, the voltage of the first node decreases from the second voltage to the first voltage by resonance based on the inductive load and the resonant capacitor,
in response to the fourth switching element being turned on during a fourth period, part of which overlaps the third period, and the voltage of the first node decreases from the first voltage to the ground voltage by resonance based on the inductive load and the resonant capacitor.

4. The device of claim 1, further comprising:
a first diode connected between the first switching element and the first node; and
a second diode connected between the second switching element and a second node.

5. A home appliance a power converting device, the home appliance comprising:
a first capacitor;
a first switching element turned on to output a first voltage stored in the first capacitor to a first node which is one end of an inductive load;

a second switching element, one end of which is connected to the first switching element and which is turned on to decrease the voltage of the first node to the first voltage;

a third switching element turned on to output a second voltage greater than the first voltage to the first node which is one end of the inductive load;

a fourth switching element, one end of which is connected to the third switching element and which is turned on to decrease the voltage of the first node to the ground voltage; and a resonant capacitor coupled between the other end of the inductive load and the ground, wherein in response to the first switching element being turned on during a first period, the voltage of the first node increases to the first voltage by resonance based on the inductive load and the resonant capacitor, and wherein, in response to the third switching element being turned on during a second period, part of which overlaps the first period, and the voltage of the first node increases from the first voltage to the second voltage by resonance based on the inductive load and the resonant capacitor.

6. The home appliance of claim 5, wherein in response to the first switching element being turned on during a first period, the voltage of the first node increases to the first voltage by resonance based on the inductive load and the resonant capacitor, in response to the third switching element being turned on during a second period, part of which overlaps the first period, and the voltage of the first node increases from the first voltage to the second voltage by resonance based on the inductive load and the resonant capacitor.

7. The home appliance of claim 6, wherein in response to the second switching element being turned on during a third period separated from the second period, the voltage of the first node decreases from the second voltage to the first voltage by resonance based on the inductive load and the resonant capacitor, in response to the fourth switching element being turned on during a fourth period, part of which overlaps the third period, and the voltage of the first node decreases from the first voltage to the ground voltage by resonance based on the inductive load and the resonant capacitor.

8. The home appliance of claim 5, wherein the home appliance further comprising:

a first diode connected between the first switching element and the first node; and a second diode connected between the second switching element and a second node.

\* \* \* \* \*